Figure 1:
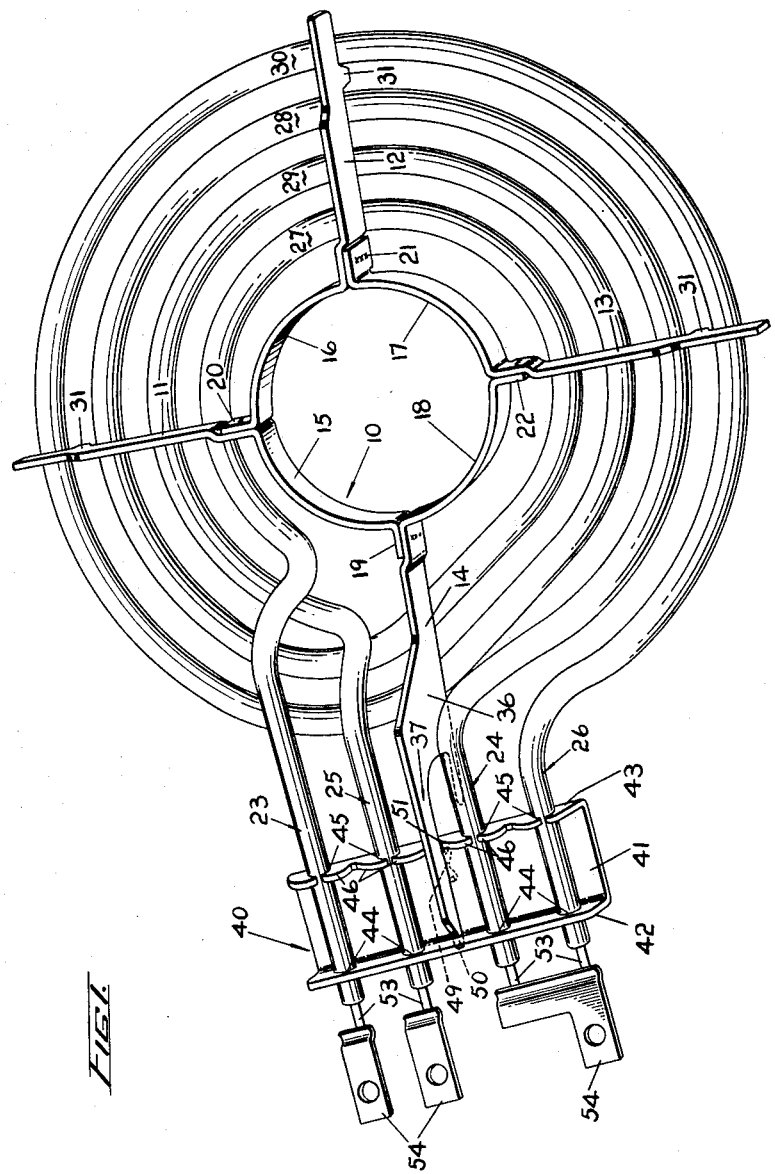

May 31, 1960    E. S. SMITH    2,938,989
ELECTRICAL HEATER UNITS
Filed Dec. 11, 1958    2 Sheets-Sheet 1

INVENTOR
E. S. SMITH
BY
Maybee & Legris
ATTORNEYS.

May 31, 1960
E. S. SMITH
2,938,989
ELECTRICAL HEATER UNITS
Filed Dec. 11, 1958
2 Sheets-Sheet 2
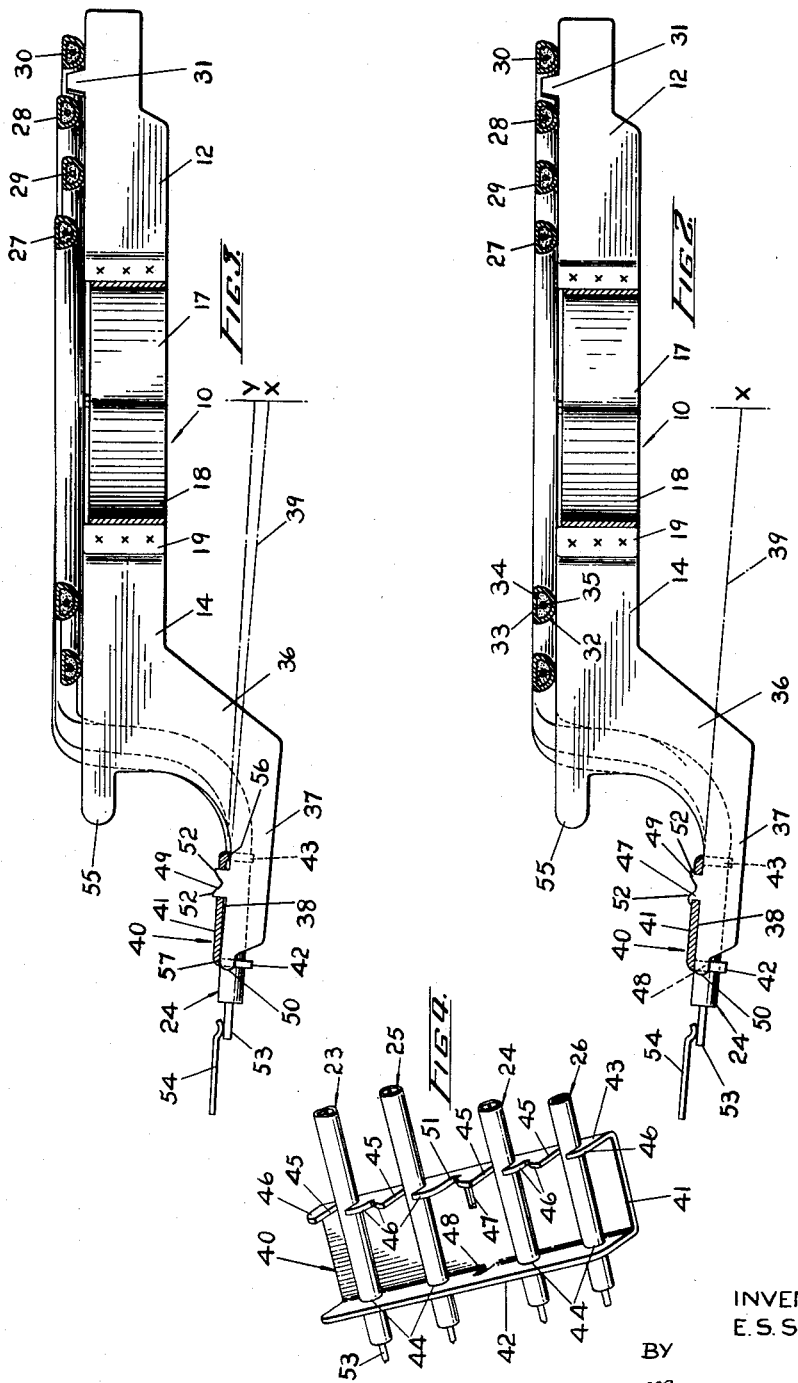
INVENTOR
E. S. SMITH
BY
*Maybee & Legris*
ATTORNEYS.

United States Patent Office 2,938,989
Patented May 31, 1960

2,938,989

ELECTRICAL HEATER UNITS

Elmore Stanley Smith, Toronto, Ontario, Canada, assignor to Moffats Limited, Weston, Ontario, Canada, a corporation Filed Dec. 11, 1958, Ser. No. 779,706

15 Claims. (Cl. 219—37)

This invention relates to heating units and is particularly concerned with surface heating units for use in electric ranges for cooking purposes.

The invention is concerned with the type of heating unit which includes an elongated electrical element which has been bent to form a generally horizontal coiled portion which provides the heating or cooking surface. The coiled portions of such elements are supported in use by a supporting means which conventionally consists of a spider under the element having radially extending supporting arms. The element is normally made from a helix of electrical resistance wire which is embedded in insulating powder within an outer tube which provides the outer surface of the coiled element. The element is initially of circular cross-section and is coiled into a flat coiled portion with the ends of the element extending at right angles to the coiled portion. The element is then placed in a coining press having a flat upper die and a lower die having grooves of semi-circular cross-section located to correspond with the coiled portion. The coining of the element flattens the coiled portion and deforms the tube to provide a flat upper surface for heating. The end portions of the element are then bent to lie generally parallel to the coiled portion but offset downwardly therefrom.

Recently, the acceptable cross-sectional size of the tubes used for such heating elements has decreased and this has aggravated a problem found in heating units of this type. This problem is to ensure permanent flatness of the heating surface of the element in spite of the tendency of the element to warp out of shape with repeated thermal expansions and contractions, and rough physical treatment in a range. Various constructions have been proposed to solve this problem and the means employed are usually arranged to permit considerable freedom of lateral movement of the element on the spider while considerably restricting the vertical movement of the element relatively to the spider. Thus the element may distort laterally but is prevented from rising from the spider to a substantial extent and is prevented from dropping due to the fact that it is supported by the spider. For efficient cooking it is essential that the largest possible area of the base of the cooking pot be in contact with the heater element and it is therefore essential that the heating surface remain flat.

It is an object of the invention to provide an improved means of securing a heating element to a support means so that the heater element remains flat on the support means.

It is a further object of the invention to provide an improved method of assembling a heater unit, which includes a heating element and support means, so that the heater element remains flat on the supporting member.

The invention will now be described by way of example with reference to the accompanying drawings, in which like reference numerals indicate similar parts throughout the several views, and in which:

Figure 1 is an underneath perspective view of a heating unit according to the invention, Figure 2 is a transverse cross-sectional view of the heating unit of Figure 1, Figure 3 is a cross-sectional view similar to Figure 2 but showing the heater unit in the course of assembly, and Figure 4 is a detail of the clamping member shown during the course of assembly of the heater unit.

Referring now to Figures 1 and 2, the heater unit of the invention includes a support member indicated generally at 10 having radial arms 11, 12, 13 and 14 extending from a central ring. The ring is composed of four segments indicated at 15, 16, 17 and 18 respectively. The segment 15 is formed integrally with the arm 11, the segment 16 is formed integrally with the arm 12, the segment 17 is formed integrally with the arm 13 and the segment 18 is formed integrally with the arm 14. Each segment is formed with a radial tongue at the free end of the segment, thus the segment 15 is formed with a tongue 19, the segment 16 with a tongue 20, the segment 17 with a tongue 21 and the segment 18 with a tongue 22. The tongues are spot welded to adjacent arms to fabricate the support member, thus it will be seen that the tongue 19 is welded to the arm 14, the tongue 20 is welded to the arm 11, the tongue 21 is welded to the arm 12 and the tongue 22 is welded to the arm 13.

Mounted on the support member are two elongated electrical heating elements each of which is bent to form a substantially flat coiled portion and to provide a pair of generally parallel end portions offset below the coiled portion and extending away therefrom. The coiled portions of the elements are interlaced to provide a substantially flat, horizontal cooking surface. Thus, referring to Figure 1, one of the heating elements has free end portions 23 and 24 while the other element has free end portions 25 and 26. It will be seen that all the free end portions are generally parallel to one another and are adjacent. The element having the free end portions 23 and 24 also consists of a coiled portion consisting of the convolutions 27 and 28 whereas the element having the free end portions 25 and 26 includes a coiled portion consisting of the convolutions 29 and 30. Each of the arms 11, 12 and 13 has an upwardly directed projection 31 which is interposed between the convolutions 28 and 30. The projections are dimensioned to permit any lateral movement of the element caused by thermal expansion or "creep" of the alloy from which the tubes are made but to restrict any further lateral movement not so caused.

The coiled portion of each element consists of a tube, one of which is indicated at 32, having a flattened surface 33 which provides the heating surface. Embedded in an insulating powder 34 in the tube 32 is a helix of resistance wire 35. When electrical current is passed through the resistance wire 35, the tube 32 is heated and provides the heating or cooking surface.

It will be seen from Figures 2 and 3 that the free end portions of the elements extend substantially horizontally away from the coiled portions but are offset downwardly therefrom. Moreover, the offset end portions 23, 24, 25 and 26 of the elements do not have a flattened surface and are substantially circular in cross-section.

The arm 14 has a downwardly offset portion 36 which terminates in an extension arm 37. The upper surface 38 of the extension arm is inclined to the horizontal and slopes downwardly towards the centers of the coiled portions of the elements. This is indicated by the dotted line 39 (see Figure 2) which slopes downwardly to a point X beneath the centers of the coiled portions of the elements.

The free end portions of the elements are gripped in a clamping member of substantially U-section indicated generally at 40. The clamping member has a web 41 and flanges 42, 43 extending along the edges of the web. The flange 42 is provided with apertures 44 through which the free end portions 23, 24, 25, 26, pass. The flange 43 is provided with slots 45 in which the free end portions 23, 24, 25 and 26 are received and in which they are secured by bent over portions 46 of the flange 43. The web 41 of the clamping member is provided with a first slot 47 and the flange 42 is provided with a second slot 48. The extension arm 37 is provided with a first projection 49 which extends through the slot 47 and, adjacent to its end, is provided with a second projection 50 which passes through the slot 48. The extension arm 37 is received in a slot 51 in the flange 43 and the projection 49 is staked over at 52 to force the web 41 of the clamping member 40 into contact with the upper surface 38 of the extension arm 37. By this action the convolutions of the heater elements are brought down into positive engagement with the top surfaces of the radial arms of the spider. The staked over projection forms a stressed connection between the clamping member 40 and the extension arm 37.

The ends of the elements are provided with conductors 53 and contact strips 54 to plug into a fitting on a range (not shown) to supply electrical energy to the elements. The arm 14 is provided with an extension 55 to coact with a part of the range to hold the heater unit in position.

The assembly of the heating unit will now be described in detail. After the heater element convolutions have been coined and the free ends have been bent to the desired shape, the convolutions are arranged together to form a cooking surface and the free end portions 23, 24, 25 and 26 are placed through the apertures 44 in the flange 42 of the clamping member 40 as shown in Figure 4. The free end portions are also arranged to lie in the open slots 45 as shown in the Figure 4 and the portions 46 are then bent over so that they positively grip the free end portions 23, 24, 25 and 26. At this stage of assembly the elements and the clamping member are a unitary structure.

The combined heating elements and clamping member are then mounted on the spider as shown in Figure 3 so that the projection 50 is engaged in the slot 48 and so that the projection 49 extends through the slot 47. It will be seen from Figure 3 that at this stage of assembly the convolutions 27, 28, 29 and 30 are not in contact with the upper surfaces of the arms of the spider.

When the heating elements are coiled, there is an allowable tolerance of approximately ¼" out of flat and a typical configuration which might be obtained is shown in Figure 3 with the convolutions 27 and 28 standing proud of the convolutions 29 and 30. It will also be seen that at this stage of assembly the web 41 of the clamping member 40 is not in contact across its whole width with the upper surface 38 of the extension arm 37, but there is a gap, indicated at 56 (Figure 3) between the web of the clamping member and the upper surface 38 of the extension arm 37. If the undersurface of the web 41 is extended to the center line of the elements it intersects the center line at the point Y which is some distance above the point X mentioned above.

The next stage in the assembly is that the web 41 of the clamping member 40 is urged towards the upper surface 38 of the arm 37 until all the convolutions of the heater elements are in positive engagement with the upper surfaces of the arms of the spider wherever the convolutions overlie said surfaces. It will be seen that, as the web 41 is forced towards the surface 38, the clamping member will tend to pivot about the top part of the slot 48 indicated at 57 in Figure 3 and the convolutions will be forced down onto the supporting surfaces, i.e. the upper surfaces of the radial arms of the spider. The inclination of the surface 38 to the horizontal is chosen so that, by forcing the web 41 into contact with a surface 38 so that the point Y in Figure 3 is moved downwardly to co-incide with the point X, all the convolutions may be forced into positive engagement with the supporting surfaces of the radial arms so long as the convolutions lie within the allowable manufacturing tolerances of deviation from the flat. When the web 41 is in contact with the surface 38 then the portions 52 of the projection 49 are staked over to provide the stressed connection and maintain the web 41 of the clamping member in contact with the surface 38.

Looked at from a somewhat different point of view, the clamping member 40 is forced downwardly until all the convolutions are in contact with the upper surfaces of the spider arms. The distance through which the clamping member should be forced downwardly towards the arm 37 is, theoretically, just sufficient so that all the convolutions are brought into contact with the arms of the spider. In practice, however, the upper surface 38 of the arm 37 is usually sloped as described and the web 41 on the clamping member urged down into contact with the surface 38. However, the surface 38 could be made horizontal and the clamping member urged towards the surface until the convolutions were all in contact with the supporting surfaces of the spider arms after which the projection 49 would be staked over.

Once the heater unit has been assembled it will be seen that the convolutions of the heater elements are all in contact with the supporting surfaces of the spider arms whereby a substantially flat horizontal heating surface is obtained. However, the convolutions have freedom to expand and contract laterally but will not rise from the supporting surfaces due to the positioning of the clamping member. After repeated use the tubes of the heater element anneal themselves and lie naturally on the supporting surfaces.

It will be seen that the invention provides a simple and improved means of assembling a heater unit so that the heating surface is substantially horizontal and yet has freedom to expand or contract laterally during operation.

Although the invention has been described with reference to a heating unit having two elements arranged in a particular manner, it will be appreciated that the invention is also applicable to heating units having two elements arranged in a different manner and to heating units having only a single element.

It will be understood that the form of the invention herewith shown and described is a preferred example and various modifications can be carried out without departing from the spirit of the invention or the scope of the appended claims:

What I claim as my invention is:

1. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, an extension arm of the support member extending away from the supporting surfaces and having an upper surface inclined to the horizontal and sloping downwardly towards the center of the coiled portion, a channel-section clamping member having a web and flanges extending along the edges of the web, one of said flanges having apertures therein through which the free end portions of the element pass, the other flange of the clamping member having slots in which the end portions of the element are received, bent over portions of said other flange securing the end portions in the slots so that the end portions are positively gripped by the clamping member, and means interconnecting the clamping member and the arm and urging the member into contact with the upper surface of the arm to cause the coiled portion of the element to contact the supporting surfaces at all positions where said portion overlies such surfaces.

2. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, an extension arm of the support member extending generally horizontally away from the supporting surfaces and being downwardly offset therefrom, the upper surface of the extension arm being inclined to the horizontal and sloping downwardly towards the center of the coiled portion, a projection upstanding from the upper surface of the extension arm, a clamping member positively gripping both of the free end portions of the element and a slot in the clamping member through which said projection passes, the projection being staked over to urge the member into contact with the upper surface of the arm to cause the coiled portion of the element to contact the supporting surfaces at all positions where said portion overlies such surfaces.

3. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, an extension arm of the support member extending away from the supporting surfaces and offset downwardly therefrom, a U-section clamping member having a web and flanges extending along the edges of the web, one of said flanges having apertures through which the free end portions pass, the other of the flanges having slots in which the free end portions are received, bent over portions of said other flange gripping the free end portions in the slots so that the free end portions are positively gripped by the clamping member, a first slot in the web of the clamping member, a second slot in the flange of the clamping member remote from the coiled portion of the element, a first projection on the upper surface of the extension arm passing through the first slot in the clamping member and a second projection adjacent the end of the extension arm passing through the second slot in the clamping member, the first projection being staked over and urging the clamping member into contact with the upper surface of the extension arm to cause the coiled portion of the element to contact the supporting surfaces at all positions where said portion overlies such surfaces.

4. A heating unit according to claim 3, wherein the extension arm has an upper surface inclined to the horizontal and sloping downwardly towards the center of the coiled portion of the element, the clamping member being urged into contact with said upper surface by the staking over of the first projection.

5. A heating unit comprising a first elongated electrical heater element having a generally horizontal coiled portion and two adjacent, generally parallel, free end portions extending substantially horizontally away from, and offset below, the coiled portion, a second elongated electrical heater element having a generally horizontal coiled portion and two adjacent, generally parallel, free end portions extending substantially horizontally away from, and offset below, said coiled portion of the second element, the elements being arranged so that the coiled portions thereof provide a substantially flat horizontal heating surface and so that all their free ends are adjacent and parallel to one another, a support member disposed below the elements, supporting surfaces on the member for contacting the coiled portions of the elements to support them horizontal, an extension arm of the support member extending away from the supporting surfaces and offset downwardly therefrom, the extension arm having an upper surface which is inclined to the horizontal and slopes downwardly towards the center of the coiled portions, a U-section clamping member having a web and flanges extending along the edges of the web, one of said flanges having apertures through which the free ends pass, the other of the flanges having slots in which the free end portions are received, bent over portions of the other flange securing the free end portions in the slots so that the free end portions are positively gripped by the clamping member, a first slot in the web of the clamping member, a second slot in the flange of the clamping member remote from the coiled portions of the element, an upwardly directed extension on the upper surface of the extension arm, and a second projection adjacent the end of the extension arm, the first projection passing through the first slot in the clamping member and the second projection passing through the second slot in the clamping member, the first projection being staked over to urge the clamping member into contact with the upper surface of the extension arm to cause the coiled portions of the element to contact the supporting surfaces in all positions where said portions overlie such surfaces.

6. A method of assembling a heating unit which includes an elongated electrical heater element which has been bent to form a generally flat coiled portion and a pair of generally parallel, free end portions offset from the coiled portion and which has the free end portions gripped in a clamping member; and a supporting member having supporting surfaces for supporting the coiled portion and an extension arm offset from the supporting surfaces; the method comprising: positioning the element on the support member so that the coiled portion overlies the supporting surfaces and the clamping member overlies the extension arm; urging the clamping member towards the arm sufficiently to cause the coiled portion to contact the supporting surfaces at all positions where said portion overlies such a surface, and securing the clamping member to the arm while the coiled portion is in contact with the supporting surface.

7. A method of assembling a heating unit which includes an elongated electrical heater element bent to form a generally flat coiled portion and a pair of adjacent, generally parallel, free end portions offset from the coiled portion, the method comprising: clamping both free end portions of the element in a clamping member; mounting the element and clamping member on a support member, the support member having supporting surfaces for supporting the coiled portion and an extension arm offset from the supporting surfaces, the element being mounted so that the coiled portion overlies the supporting surfaces and so that the clamping member overlies the extension arm; urging the clamping member towards the extension arm sufficiently to cause the coiled portion to contact the supporting surfaces at all positions where said portion overlies such surfaces; and securing the clamping member to the arm while the coiled portion is in contact with the supporting surfaces.

8. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, an extension arm of the support member extending away from the supporting surfaces, a clamping member positively gripping both of the free end portions of the element, and a stressed connection between the clamping member and the arm to hold the coiled portion of the element in positive engagement with the supporting surfaces at all positions where said portion overlies such surfaces, said connection providing the sole means of holding said coiled portion in engagement with the supporting surfaces.

9. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, an extension arm of the support member extending away from the supporting surfaces and having an upper surface inclined to the horizontal and sloping downwardly towards the center of the coiled portion, a clamping member positively gripping both of the free end portions of the element, and a stressed connection between the clamping member and the arm urging the member into contact with the upper surface of the arm whereby to hold the coiled portion of the element in positive engagement with the supporting surfaces at all positions where said portion overlies such surfaces, said connection providing the sole means of holding said coiled portion in engagement with the supporting surfaces.

10. A heating unit comprising an elongated electrical heater element having a generally horizontal coiled portion and two adjacent, generally parallel, free end portions extending substantialy horizontally away from, and offset below, the coiled portion, a support member disposed below the element, supporting surfaces on the member for contacting the coiled portion of the element to support it horizontal, an extension arm of the support member extending away from the supporting surfaces and having an upper surface inclined to the horizontal and sloping downwardly towards the center of the coiled portion, a clamping member secured to both of the free end portions of the element, bent over portions on the clamping member positively gripping both said free end portions, and a stressed connection between the clamping member and the arm urging the member into contact with the upper surface of the arm whereby to hold the coiled portion of the element in positive engagement with the supporting surfaces at all positions where said portion overlies such surfaces, said connection providing the sole means of holding said coiled portion in engagement with the supporting surfaces.

11. A heating unit comprising an elongated electrical heater element having a generally horizontal coiled portion and two adjacent, generally parallel, free end portions extending substantially horizontally away from, and offset below, the coiled portion, a support member disposed below the element, the support member including a plurality of radially extending arms, upper surfaces of the arms forming supporting surfaces for contacting the coiled portion of the element to support it horizontal, an extended portion of one of the arms offset downwardly and extending away from the supporting surfaces, the upper surface of the extended portion being inclined to the horizontal and sloping downwardly towards the center of the coiled portion, and a stressed connection between the clamping member and the extended portion urging the member into contact with the upper surface of the extended portion whereby to hold the coiled portion of the element in positive engagement with the supporting surfaces at all positions where said portion overlies such surfaces, said connection providing the sole means of holding said coiled portion in engagement with the supporting surfaces.

12. A heating unit comprising an elongated electrical heater element having a generally horizontal coiled portion and two adjacent, generally parallel free end portions extending substantially horizontally away from, and offset below, the coiled portion, a support member disposed below the element, the support member including a plurality of radially directed support arms having substantially horizontal upper surfaces for contacting the coiled portion of the element to support it horizontal, an extension arm of the support member extending generally horizontally away from the supporting surfaces and being offset downwardly therefrom, an extension arm having an upper surface inclined to the horizontal and sloping downwardly towards the center of the coiled portion, a clamping member positively gripping both of the free end portions of the element, and a stressed connection between the clamping member and the arm and urging the member into contact with the upper surface of the arm whereby to hold the coiled portion of the element in positive engagement with the supporting surfaces at all positions where said portion overlies such surfaces, said connection providing the sole means of holding said coiled portion in engagement with the supporting surfaces.

13. A heating unit comprising a first elongated electrical heater element having a generally horizontal coiled portion and two adjacent, generally parallel, free end portions extending substantially horizontally away from, and offset below, the coiled portion, and a second elongated electrical heater element having a generally horizontal coiled portion and two adjacent, generally parallel, free end portions extending substantially horizontally away from, and offset below, their associated coiled portion, the elements being arranged so that the coiled portions co-act to form a substantially flat and horizontal heating surface and so that their free ends lie adjacent and generally parallel to one another, a support member disposed below the elements, supporting surfaces on the member for contacting the coiled portions of the elements to support them horizontal, an extension arm on the support member extending generally horizontally away from the supporting surfaces and offset downwardly therefrom, a clamping member positively gripping said free end portions of both of the elements, and a stressed connection between the clamping member and the arm to hold the coiled portions of the elements in positive engagement with the supporting surfaces in all positions where said portions overlie such surfaces, said connection providing the sole means of holding said coiled portions in engagement with the supporting surfaces.

14. A heating unit comprising an elongated electrical heater element having a generally horizontal coiled portion and two adjacent, generally parallel, free end portions extending substantially horizontally away from, and offset below, the coiled portion, a support member disposed below the element, supporting surfaces on the member for contacting the coiled portion of the element to support it horizontal, upstanding projections on the supporting surfaces laterally to locate the element with a predetermined amount of free lateral movement, an extension arm of the support member extending away from the supporting surfaces, a clamping member positively gripping both of the free end portions of the element, and a stressed connection between the clamping member and the arm to hold the coiled portion of the element in positive engagement with the supporting surfaces at all positions where said portion overlies such surfaces, said connection providing the sole means of holding said coiled portion in engagement with the supporting surfaces.

15. A heating unit comprising a first elongated electrical heater element having a generally horizontal coiled portion and two adjacent, generally parallel, free end portions extending substantially horizontally away from, and offset below, the coiled portion, and a second elongated electrical heater element having a generally horizontal coiled portion and two adjacent, generally parallel, free end portions extending substantially horizontally away from, and offset below, their associated coiled portion, the elements being arranged so that the coiled portions co-act to form a substantially flat and horizontal heating surface and so that their free ends lie adjacent and generally parallel to one another, a support member disposed below the elements, supporting surfaces on the member for contacting the coiled portions of the elements to support them horizontal, an extension arm on the support member extending generally horizontally away from the supporting surfaces and offset downwardly therefrom, the extension arm having an upper surface inclined to the horizontal and sloping downwardly towards the center of the coiled portions of the element, a projection on said upper surface, a clamping member positively gripping said free end portions of both of the elements, the clamping member having a slot therein through which said projection passes, the projection being staked over and urging the member into contact with the upper surface of the arm to cause the coiled portions of the elements to contact the supporting surfaces in all positions where said portions overlie such surfaces.

References Cited in the file of this patent

UNITED STATES PATENTS

| 2,877,334 | McOrlly et al. | Mar. 10, 1959 |
| 2,923,802 | Price | Feb. 2, 1960 |

FOREIGN PATENTS

| 767,887 | Great Britain | Feb. 6, 1957 |